US009426731B1

(12) United States Patent
Uy et al.

(10) Patent No.: US 9,426,731 B1
(45) Date of Patent: Aug. 23, 2016

(54) MOBILE NETWORK OPERATOR SELECTION

(71) Applicant: Verizon Patent and Licensing Inc., Arlington, VA (US)

(72) Inventors: Warren Hojilla Uy, Randolph, NJ (US); Manuel Enrique Caceres, Basking Ridge, NJ (US); Ruben Cuadrat, New York, NY (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 0 days.

(21) Appl. No.: 14/700,787

(22) Filed: Apr. 30, 2015

(51) Int. Cl.
*H04W 4/00* (2009.01)
*H04W 48/18* (2009.01)
*H04L 29/08* (2006.01)
*H04W 4/02* (2009.01)

(52) U.S. Cl.
CPC .............. *H04W 48/18* (2013.01); *H04L 67/303* (2013.01); *H04W 4/02* (2013.01)

(58) Field of Classification Search
CPC ....... H04W 48/18; H04W 4/02; H04L 67/303
See application file for complete search history.

(56) References Cited

U.S. PATENT DOCUMENTS

| 8,559,344 | B2* | 10/2013 | Abusch-Magder | H04W 36/0083 370/310 |
| 2008/0049702 | A1* | 2/2008 | Meylan | H04W 48/20 370/342 |
| 2009/0221287 | A1* | 9/2009 | Balasubramanian | H04W 48/16 455/434 |
| 2011/0014919 | A1* | 1/2011 | Otte | H04W 36/0061 455/442 |
| 2012/0236776 | A1* | 9/2012 | Zhang | H04W 48/12 370/312 |
| 2014/0045505 | A1* | 2/2014 | Henry | H04W 36/0061 455/444 |
| 2014/0098682 | A1* | 4/2014 | Cao | H04W 36/0083 370/252 |

* cited by examiner

*Primary Examiner* — Kashif Siddiqui

(57) ABSTRACT

A mobile communication device may include a universal integrated circuit card to store a plurality of mobile network operator (MNO) profiles. The mobile communication device may further include logic configured to retrieve the stored plurality of MNO profiles from the UICC; obtain a list of available MNOs by communicating with base stations located within a transmission range of the mobile communication device; obtain a list of partner MNOs from a subscription system; filter the obtained list of available MNOs based on the obtained list of partner MNOs; and display selectable MNOs based on the retrieved MNO profiles and based on the filtered list of available MNOs.

20 Claims, 9 Drawing Sheets

MOBILE NETWORK OPERATOR SELECTION

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. A mobile communication device may include a Subscriber Identity Module (SIM) card that includes information that enables the mobile communication device to connect to a wireless access network. Managing information stored on a SIM card may pose various challenges.

DETAILED DESCRIPTION OF PREFERRED EMBODIMENTS

Figure 1:
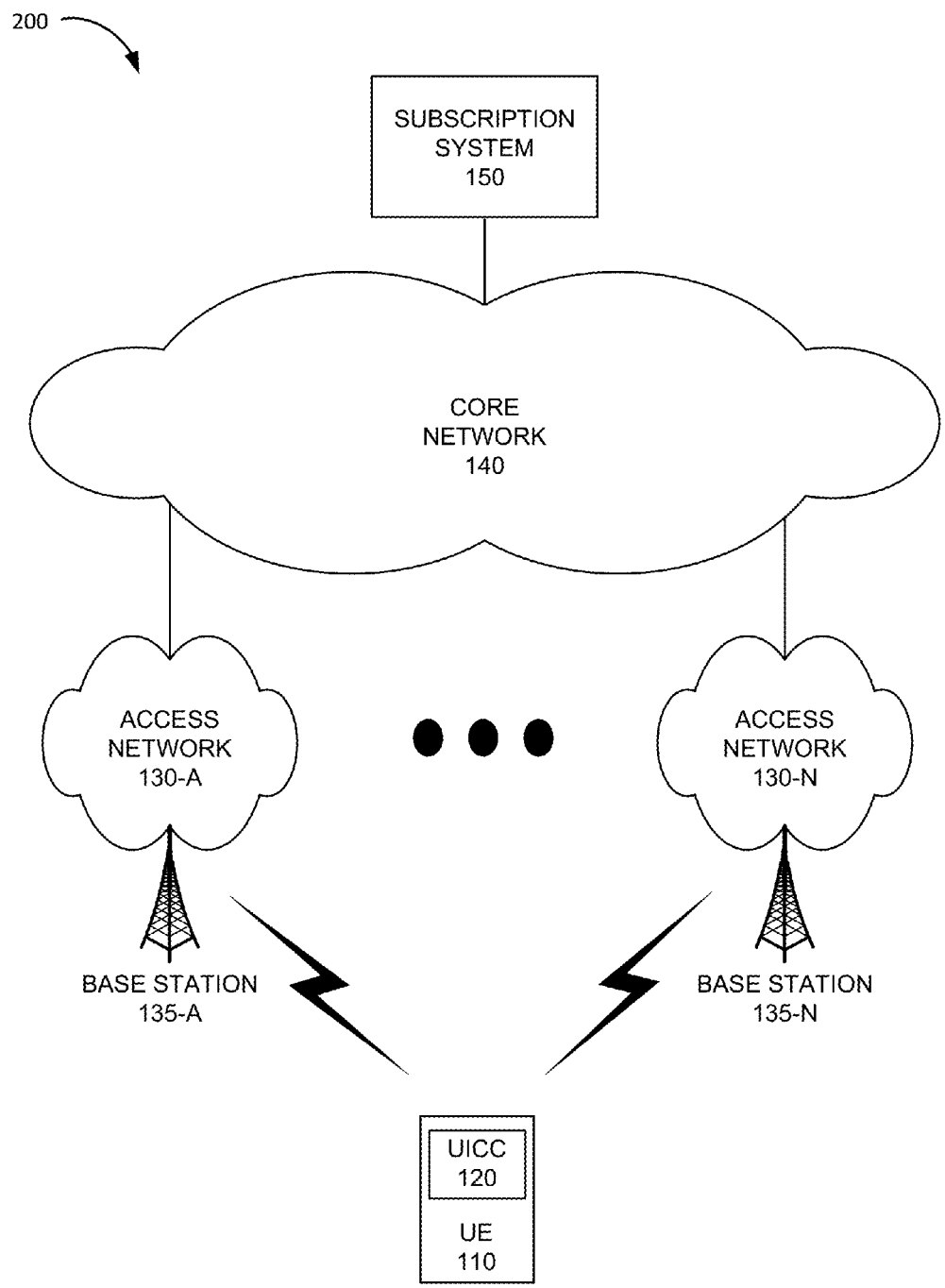
FIG. 1 is a diagram illustrating an environment according to an implementation described herein.

The following detailed description refers to the accompanying drawings. The same reference numbers in different drawings identify the same or similar elements.

A SIM card may be configured for a subscription that may be established with a mobile network operator (MNO) when the SIM card is included in a wireless communication device (e.g., a mobile phone). However, a user may desire to use a SIM card for multiple subscriptions. As an example, the user may bring the mobile phone to a different country where a different set of MNOs is operating. As another example, the user may wish to use the same mobile phone with a first subscription and a first MNO for business purposes and with a second subscription and a second MNO for personal purposes. As yet another example, a device with an embedded machine-to-machine (M2M) wireless interface may be installed in various locations, with different locations being served by different MNOs. A SIM card configured for multiple subscriptions would satisfy such requirements. The configuration for multiple subscriptions may enable the mobile communication device to establish a connection with different MNOs depending on the situation.

Implementations described herein relate to mobile operator selection. A wireless communication device, also referred to herein as User Equipment (UE) may include a Universal Integrated Circuit Card (UICC). The UICC may be configured for multiple subscriptions with each subscription associated with a particular MNO and the UE may be configured to activate one of the multiple subscriptions based on a user selection and/or based on an automatic selection.

The UICC may store MNO profiles for different MNOs. A particular MNO profile may include a mobile country code (MCC) and a mobile network code (MNC) associated with the particular MNO profile; a telephone number assigned to the UICC by the MNO of the particular MNO profile; an authentication key associated with the particular MNO profile; an activation application associated with the particular MNO profile; a billing application associated with the particular MNO profile; and/or an updates application associated with the particular MNO profile.

A subscription system, which may in some implementations also function as an Over-the-air programming (OTA) activation system for the UICC, may maintain a list of partner MNOs for the UICC. A partner MNO may include a particular MNO that has a service agreement with a provider of the UICC and/or UE. An MNO profile for a partner MNO may be indicated as selectable to the user for activation when the user is provided with a list of selectable MNOs.

The UE may select to perform activation, or re-activation, of the UICC. The UE may select to perform the activation or re-activation in response to detecting that the UICC has been connected to the UE; in response to detecting that a communication capability of the UE has been activated; in response to detecting that the UE is located in a new geographic area; and/or in response to a different type of trigger event.

The UE may retrieve stored MNO profiles from the UICC; may obtain a list of available MNOs by communicating with base stations located within a transmission range of the mobile communication device; and may obtain a list of partner MNOs from a subscription system. The UE may further filter the obtained list of available MNOs based on the obtained list of partner MNOs and may display selectable MNOs based on the retrieved MNO profiles and based on the filtered list of available MNOs.

In some implementations, the UE may further receive a selection of one of the selectable MNOs from a user, may activate an MNO security domain associated with the selected MNO in the UICC, and may connect to the selected one of the selectable MNOs, in response to receiving the selection of one of the selectable MNOs from the user. In other implementations, the UE may automatically select one of the selectable MNOs based on one or more criteria, such as based on a ranked list of preferred MNOs, a signal strength associated with particular one of the available MNOs, and/or a particular application associated with the mobile communication device; may activate an MNO security domain associated with the selected MNO in the UICC; and may connect to the selected one of the selectable MNOs, in response to automatically selecting of one of the selectable MNOs.

The UE may connect to the subscription system to obtain the list of partner MNOs. The UE may first attempt to use an out-of-band method, such as a WiFi or a Bluetooth connection. If an out-of-band method is not available, the UE may determine whether a default subscription is available with a default MNO and may connect to the subscription system using the default subscription. If no default subscription is available or no default subscription has been designated, the UE may select an MNO from the list of available MNOs based on one or more criteria, such as signal strength, and may connect to the subscription system using the selected MNO. If no MNOs are available, the UE may access a roaming list in the UICC, may select a base station based on the roaming list, and may connect to the subscription system via the selected base station.

In addition to a list of partner MNOs associated with the UICC, the subscription system may store update files for particular MNOs. The UICC may obtain update files for particular MNOs associated with the stored MNO profiles when obtaining the list of partner MNOs and may update the particular MNOs based on the obtained update files.

FIG. 1 is a diagram of an exemplary environment 100 in which the systems and/or methods, described herein, may be implemented. As shown in FIG. 1, environment 100 may include a UE 110, one or more access networks 130-A to 130-N (referred to herein individually as "access network 130" and collectively as "access networks 130"), a core network 140, and a subscription system 150.

UE 110 may include a mobile communication device (e.g., a mobile phone, a smart phone, a phablet device, a wearable computer device (e.g., a head-mounted display computer device, a wristwatch computer device, etc.), a global positioning system (GPS) device, and/or another type of wireless device); a laptop computer, a tablet computer, or another type of portable computer; a media playing device; a portable gaming system; and/or any other type of mobile computer device with communication and output capabilities.

In some implementations, UE 110 may correspond to an embedded wireless device that communicates wirelessly with other devices over a machine-to-machine interface. For example, UE 110 may be electrically connected to any electronic device with a microcontroller, such as a microcontroller controlling one or more actuators, a microcontroller controlling one or more sensors, a microcontroller that performs data processing, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device.

UE 110 may include a UICC 120. UICC 120 may include one or more SIMs that store information for multiple subscriptions that may be activated for UE 110 with different MNOs. UICC 120 may be electrically coupled to UE 110 by being inserted into a slot of UE 110 (not shown in FIG. 1). In some implementations, such as M2M implementations, UICC 120 may be integrally formed in UE 110. UE 110 may wirelessly communicate with one or more of access networks 130.

Access network 130 may be associated with a particular MNO and may provide access to core network 140 for wireless devices, such as UE 110. The MNO may, via access network 130, enable UE 110 to provide mobile telephone service and/or data services to a user. Access network 130 may include a base station 135 and UE 110 may wirelessly communicate with access network 130 via base station 135. Access network 130 may establish a packet data network connection between UE 110 and core network 140. For example, access network 130 may establish an Internet Protocol (IP) connection between UE 110 and core network 140.

Access network 130 may include a Long Term Evolution (LTE) access network (e.g., an evolved packet core (EPC) network) based on the LTE standard specified by the $3^{rd}$ Generation Partnership Project (3GPP). The LTE access network may include one or more devices that implement logical entities interconnected via standardized interfaces and that provide packet-switched services between UE 110 and core network 140.

Access network 130 may include a Code Division Multiple Access (CDMA) access network based on, for example, a CDMA2000 standard. For example, the CDMA access network may include a CDMA one times radio transmission technology (1×RTT) network, a CDMA High Rate Packet Data (HRPD) network (which may include a CDMA evolution optimized data only (EV-DO) network), or a CDMA eHRPD network (which may provide access to an LTE access network).

Access network 130 may include a Global System for Mobile Communications (GSM) access network based on a GSM standard. For example, the GSM access network may include a General Packet Radio Service (GPRS) network, an Enhanced Data Rates for GSM Evolution (EDGE) network, a Universal Mobile Telecommunications System (UMTS) network (also known as a wideband CDMA (W-CDMA) network), or a High Speed Packet Access (HSPA) network.

Core network 140 may include a local area network (LAN), a wide area network (WAN), a metropolitan area network (MAN), a public land mobile network (PLMN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks. Core network 140 may allow the delivery of Internet Protocol (IP) services to UE 110, and may interface with other external networks. Core network 140 may include one or more server devices and/or network devices, or other types of computation or communication devices. In one example implementation, core network 140 may include an Internet Protocol Multimedia Subsystem (IMS) network (not shown in FIG. 1). An IMS network may include a network for delivering IP multimedia services as specified by 3GPP and may provide media flows between UE device 110 and external IP networks or external circuit-switched networks (not shown in FIG. 1).

Subscription system 150 may include one or more devices, such as computer devices and/or server devices, which maintain subscription information. The subscription information may include information relating to particular MNO profiles. Subscription system 150 may function as an OTA activation system for UICC 120 with respect to one or more MNOs associated with particular access networks 130. Furthermore, subscription system 150 may include a partner list of MNOs for UICC 120. The partner list may specify which particular MNOs have an existing arrangement with an entity associated with UICC 120. Moreover, subscription system 150 may maintain update files for particular MNOs and may provide the update files to UICC 120 when UE 110 requests a list of partner MNOs or in response to another type of event.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2A:
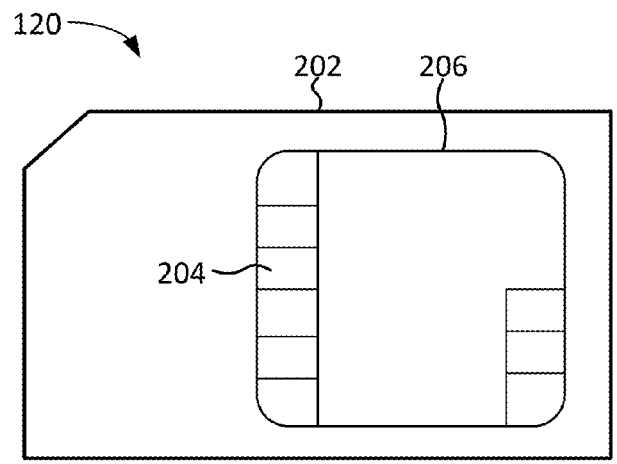
FIG. 2A is a diagram illustrating exemplary components of the universal integrated circuit card (UICC) of FIG. 1.

FIG. 2A is a diagram illustrating example components of UICC 120. As shown in FIG. 2A, UICC 102 may include a housing 202, contacts 204, and an integrated circuit (IC) area 206. Housing 202 may protect IC area 206 from outside elements. Housing 202 may include a structure configured to hold contacts 204 and IC area 206, and may be formed from a variety of materials. For example, housing 202 may be formed from plastic, metal, or a composite. Contacts 204 may include one or more contacts to electronically connect UICC 120 to UE 110. Contacts 204 may include a power contact to supply electrical power from UE 110 to UICC 120.

IC area 206 may include one or more SIM modules. For example, IC area 206 may include a Universal SIM (USIM) that stores subscriber information and authentication information for connecting to a GSM access network and/or for connecting to an LTE access network; an Internet Protocol Multimedia Subsystem (IMS) that stores a subscriber's IMS identity, such as a public IMS identity and a private IMS identity; and/or a CDMA SIM (CSIM) that stores subscriber information and authentication information for accessing a CDMA access network. Furthermore, IC area 206 may include one or more MNO profiles and a profile handler for enabling a particular MNO profile based on a user selection or based on an automatic selection. The MNO profiles may be accessed by UE 110 using a profile selection application programming interface (API).

Although FIG. 2A shows example components of UICC 120, in other implementations, UICC 120 may include fewer components, different components, differently arranged components, or additional components than depicted in FIG. 2A. Additionally or alternatively, one or more components of UICC 120 may perform the tasks described as being performed by one or more other components of UICC 120.

Figure 2B:
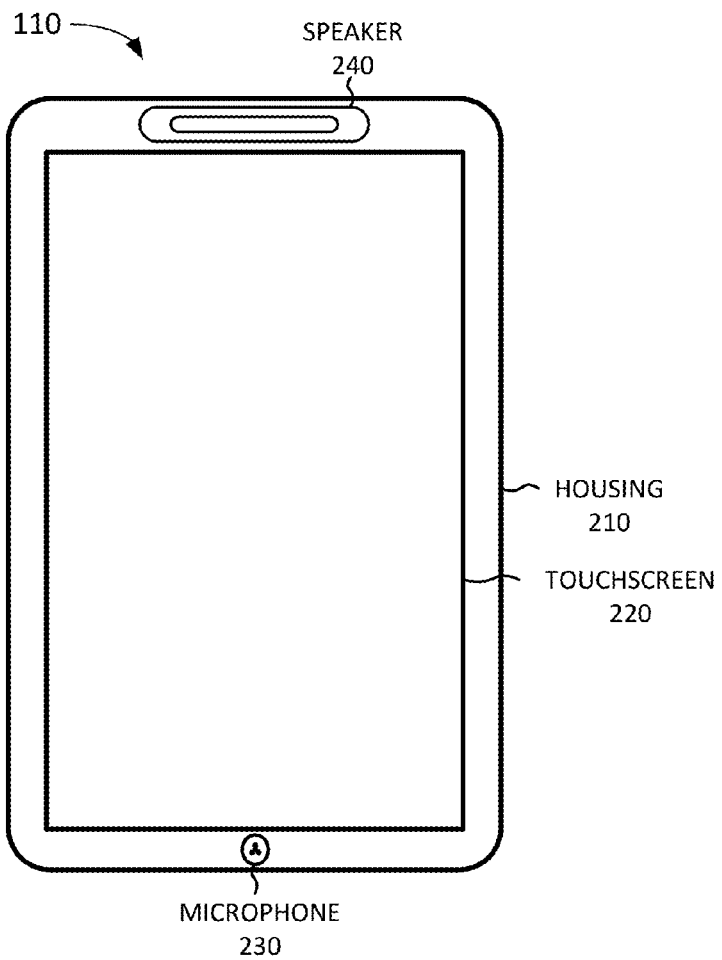
FIG. 2B is a diagram illustrating exemplary components of the user equipment (UE) of FIG. 1.

FIG. 2B is a diagram of exemplary components of UE 110 according to an implementation. As shown in FIG. 2B, UE 110 may include a housing 210, a touchscreen 220, a microphone 230, and a speaker 240.

Housing 210 may enclose UE 110 and may protect the components of UE 110 from the outside elements (e.g., moisture, dirt, etc.). Touchscreen 220 may include a display device and an input device configured to detect a user's touch. While FIG. 2B illustrates UE 110 with a touchscreen, in other implementations, UE 110 may not necessarily include a touchscreen. For example, UE 110 may include a display and a keyboard and/or keypad. Touchscreen 220 may include a liquid crystal display (LCD), an electronic ink display (e.g., an electrophoretic display), an electroluminescent display, and/or another type of display. Furthermore, touchscreen 220 may include touch sensors, such as capacitive sensors (e.g., surface capacitive sensors, projected capacitive touch sensors, etc.), resistive sensors (e.g., analog resistive sensors, digital resistive sensors, etc.), optical sensors (e.g., optical imaging sensors, rear diffused illumination sensors, infrared grid sensors, diffused surface illumination sensors, etc.), acoustic wave sensors (e.g., surface acoustic wave sensors, bending wave sensors, etc.), and/or another type of touch sensors. Furthermore, touchscreen 220 may include sensors to sense an amount of force being applied to touchscreen 220, such as piezoresistive sensors.

Microphone 230 may receive audio signals and convert the received audio signals to electrical signals for UE 110. Speaker 240 may receive electrical signals from within UE 110 and generate audio signals based on the received electrical signals.

UE 110 may include additional sensors (not shown in FIG. 2B). For example, UE 110 may include one or more tilt sensors, such as accelerometers and/or gyroscopes, configured to sense a tilt, position, and/or orientation of UE 110 in space; one or more Global Positioning System (GPS) receivers; one or more magnetic field sensors (e.g., to sense the magnetic North); motion detection sensors to sense motion in the vicinity of UE 110; and/or other types of sensors.

Although FIG. 2B shows exemplary components of UE 110, in other implementations, UE 110 may include fewer components, different components, differently arranged components, or additional components than those depicted in FIG. 2B. Additionally or alternatively, one or more components of UE 110 may perform functions described as being performed by one or more other components of UE 110.

Figure 3:
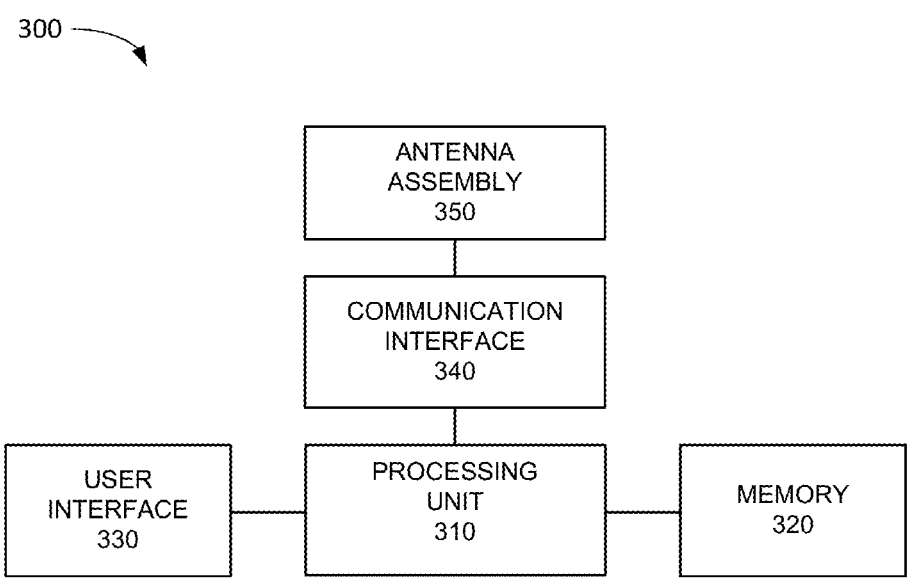
FIG. 3 is a diagram illustrating exemplary components of a device that may be included in a device of FIG. 1.

FIG. 3 is a diagram illustrating example components of a device 300 according to an implementation described herein. UE 110 and/or UICC 120 may each include one or more devices 300. As shown in FIG. 3, device 300 may include a processing unit 310, a memory 320, a user interface 330, a communication interface 340, and an antenna assembly 350.

Processing unit 310 may include one or more processors, microprocessors, application specific integrated circuits (ASICs), field programmable gate arrays (FPGAs), and/or other processing logic. Processing unit 310 may control operation of device 300 and its components.

Memory 320 may include a random access memory (RAM) or another type of dynamic storage device, a read only memory (ROM) or another type of static storage device, a removable memory card, and/or another type of memory to store data and instructions that may be used by processing unit 310.

User interface 330 may allow a user to input information to device 300 and/or to output information from device 300. Examples of user interface 330 may include a speaker to receive electrical signals and output audio signals (e.g., speaker 240); a camera to receive image and/or video signals and output electrical signals; a microphone to receive sounds and output electrical signals (e.g., microphone 230); buttons (e.g., a joystick, control buttons, a keyboard, or keys of a keypad) and/or a touchscreen to receive control commands (e.g., touchscreen 220); a display, such as an LCD, to output visual information (e.g., touchscreen 220); an actuator to cause device 300 to vibrate; and/or any other type of input or output device. In some implementations, such as a device 300 included in UICC 120, user interface 330 may correspond to contacts 204.

Communication interface 340 may include a transceiver that enables mobile communication device 110 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to antenna assembly 350 for transmitting and receiving RF signals.

Communication interface 340 may include a logical component that includes input and/or output ports, input and/or output systems, and/or other input and output components that facilitate the transmission of data to other devices. For example, communication interface 340 may include a network interface card (e.g., Ethernet card) for wired communications and/or a wireless network interface (e.g., a WiFi) card for wireless communications. Communication interface 340 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 350 may include one or more antennas to transmit and/or receive RF signals. Antenna assembly 350 may, for example, receive RF signals from communication interface 340 and transmit the signals and receive RF signals and provide them to communication interface 340.

As described herein, device 300 may perform certain operations in response to processing unit 310 executing software instructions contained in a computer-readable medium, such as memory 320. A computer-readable medium may be defined as a non-transitory memory device. A non-transitory memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Additionally or alternatively, one or more components of device 300 may perform the tasks described as being performed by one or more other components of device 300.

Figure 4:
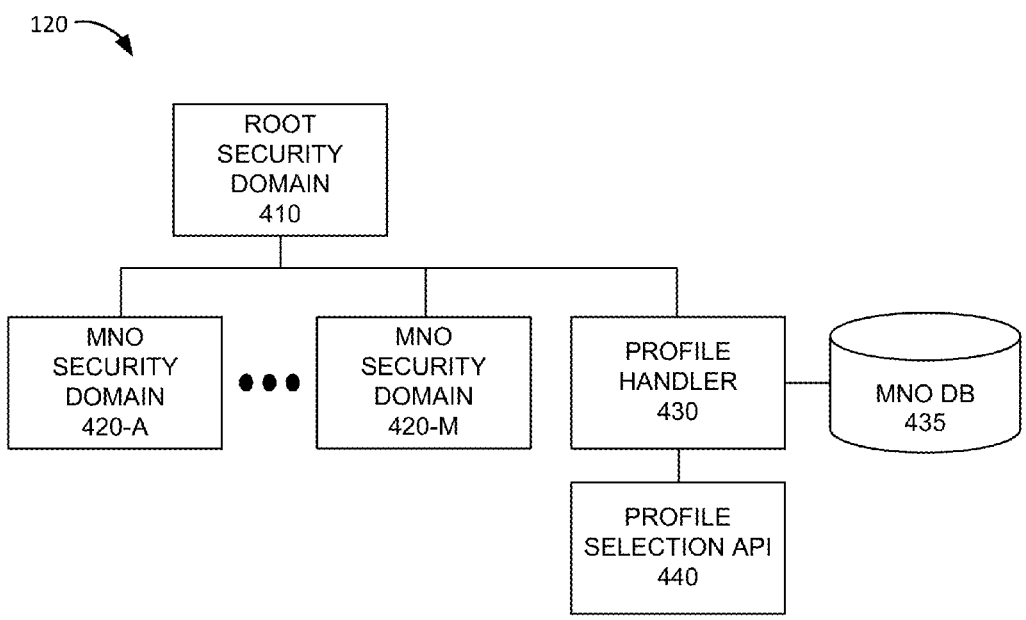
FIG. 4 is a diagram illustrating exemplary functional components of the universal integrated circuit card (UICC) of FIG. 1.

FIG. 4 is a diagram illustrating exemplary functional components of UICC 120 according to an implementation described herein. The functional components of UICC 120 may be implemented, for example, via processing unit 310 executing instructions from memory 320. Alternatively, some or all of the functional components of UICC 120 may be implemented via hard-wired circuitry. As shown in FIG. 4, the functional components of UICC 120 may include a root security domain 410, one or more MNO security domains 420-A to 420-M (referred to herein individually as "MNO security domain 420" and collectively as "MNO security domains 420"), a profile handler 430, an MNO database (DB) 435, and a profile selection API 440.

Root security domain 410 may correspond to a root security domain for UICC 120. A particular security domain may support authentication, key handling, encryption, decryption, and verification of applications within a particular domain. The root security domain 410 may be associated with the issuer/entity of UICC 120 and may authenticate communications with subscription system 150. MNO security domain 420 may correspond to an issuer security domain associated with a particular MNO. MNO security domain 420 may authenticate communications with the particular MNO.

Profile handler 430 may activate a particular MNO security domain and may handle authentication with a particular MNO based on an activated MNO security domain. Furthermore, profile handler 430 may provide information relating to stored MNO profiles in MNO DB 435 to UE 110. MNO DB 435 may store information relating to particular MNO profiles. Exemplary information that may be stored in MNO DB 435 is described below with reference to FIG. 6. Profile selection API 440 may function as an interface with UE 110.

Although FIG. 4 shows exemplary functional components of UICC 120, in other implementations, UICC 120 may include fewer functional components, different functional components, differently arranged functional components, or additional functional components than depicted in FIG. 4. Additionally or alternatively, one or more functional components of UICC 120 may perform functions described as being performed by one or more other functional components of UICC 120.

Figure 5:
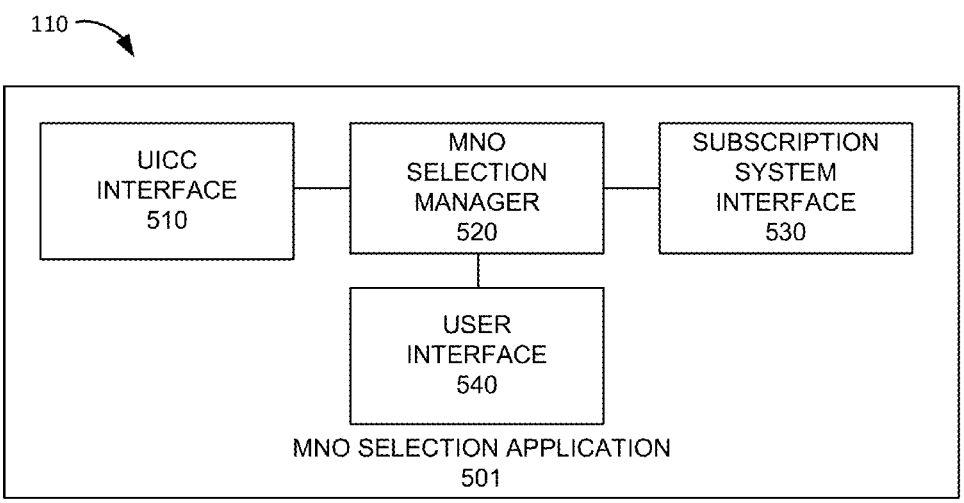
FIG. 5 is a diagram illustrating exemplary functional components of the user equipment (UE) of FIG. 1.

FIG. 5 is a diagram illustrating exemplary functional components of UE 110 according to an implementation described herein. The functional components of UE 110 may be implemented, for example, via processing unit 310 executing instructions from memory 320. Alternatively, some or all of the functional components of UICC 120 may be implemented via hard-wired circuitry. As shown in FIG. 5, UE 110 may include an MNO selection application 501. MNO selection application 501 may be activated when the user powers up UE 110, activates or re-activates the communication capability of UE 110, when UE 110 detects a new geographic area, based on the user selecting to activate MNO selection application 501, and/or based on another criterion. MNO selection application 501 may include a UICC interface 510, an MNO selection manager 520, a subscription system interface 530, and a user interface 540.

UICC interface 510 may interface with UICC 120. For example, UICC interface 510 may request information from UICC 120 via profile selection API 440 and/or may update information in UICC 120 via profile selection API 440. MNO selection manager 520 may manage selection of an MNO. MNO selection manager 520 may obtain MNO profile information from UICC 120, may obtain information relating to available MNOs from communication interface 340 of UE 110, and/or may obtain information relating to partner MNOs from subscription system 150 via subscription system interface 530.

In some implementations, MNO selection manager 520 may provide information to user interface 540 to display to the user, and may receive a user selection of an MNO via user interface 540. In other implementations, such as in an M2M implementation, MNO selection manager 520 may select an MNO automatically based on one or more criteria. For example, MNO selection manager 520 may select an MNO automatically based on a ranked list of preferred MNOs, based on the signal strength of signals received from base stations associated with detected available MNOs, based on a particular application of UE 110 that has been activated, and/or based on another type of criterion.

Subscription system interface 530 may enable communication with subscription system 150. For example, subscription system interface 530 may send a request to subscription system 150 for a list of partner MNOs associated with UICC 120. As another example, subscription system interface 530 may request and/or receive updates for a particular MNO profile from subscription system 150.

User interface 540 may generate a user interface that is displayed on touchscreen 220 (and/or another type of display device) to enable the user to select a particular MNO from a list of selectable MNOs. User interface 540 may receive a selection of an MNO from a user and may provide the received selection to MNO selection manager 520.

Although FIG. 5 shows exemplary functional components of UE 110, in other implementations, UE 110 may include fewer functional components, different functional components, differently arranged functional components, or additional functional components than depicted in FIG. 5. Additionally or alternatively, one or more functional components of UE 110 may perform functions described as being performed by one or more other functional components of UE 110.

Figure 6:
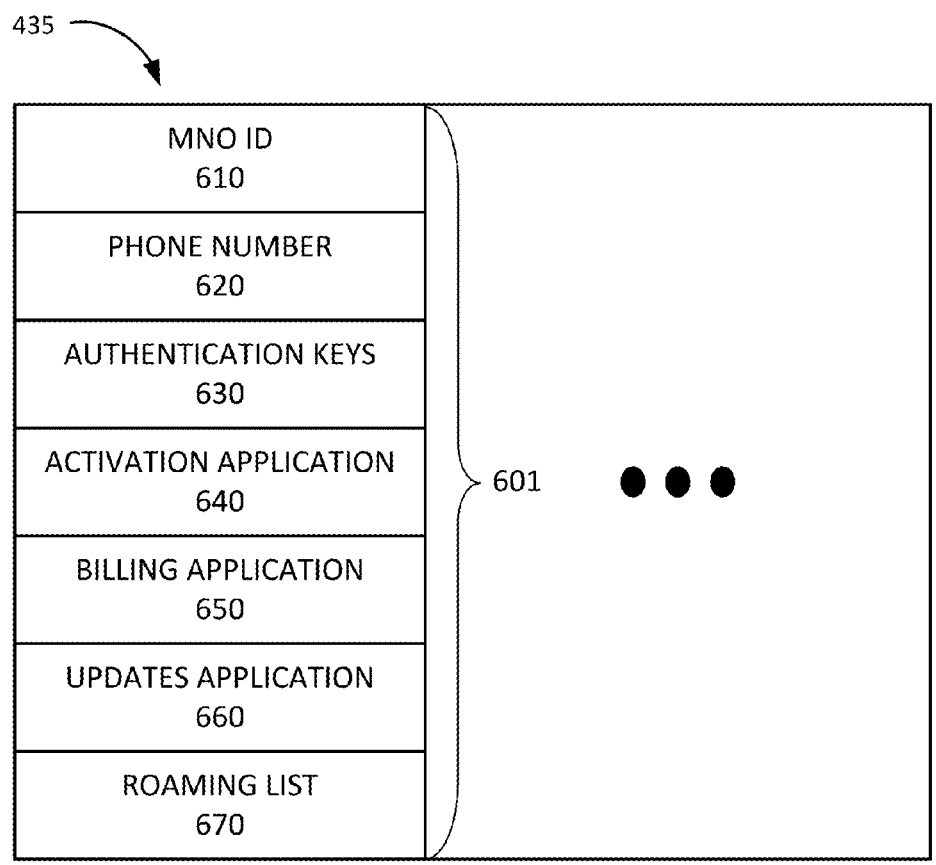
FIG. 6 is a diagram illustrating exemplary components that may be stored in the mobile network operator database of FIG. 4.

FIG. 6 is a diagram illustrating exemplary components that may be stored in MNO DB 435. As shown in FIG. 6, MNO DB 435 may include one or more MNO profile entries 601. Each MNO profile entry 601 may store information relating to a particular MNO profile. MNO profile entry 601 may include an MNO identifier (ID) field 610, a phone number field 620, an authentication keys field 630, an activation application field 640, a billing application field 650, an updates application field 660, and a roaming list field 670.

MNO ID field 610 may store an identifier associated with the particular MNO. For example, the identifier may include the MCC and the MNC associated with the particular MNO. Phone number field 620 may store a telephone number assigned to UICC 120 by the particular MNO. In some implementations, different MNOs may assign the same telephone number to UICC 120. Authentication keys field 630 may store authentication keys that may be used to authentication UICC 120 during the activation of a subscription with the particular MNO.

Activation application field 640 may store, or point to, an activation application for the particular MNO. The activation application may perform activation of a subscription for UICC 120 with the particular MNO. Billing application field 650 may store, or point to, a billing application for the particular MNO. The billing application may perform billing functions for a subscription with the particular MNO. Updates application field 660 may store, or point to, an update application for the particular MNO. The update application may perform updates of MNO profile entry 601. Roaming list field 670 may store a roaming list for the particular MNO.

Although FIG. 6 shows exemplary components that may be stored in MNO DB 435, in other implementations, MNO DB 435 may store fewer components, different components, differently arranged components, or additional components than depicted in FIG. 6.

Figure 7:
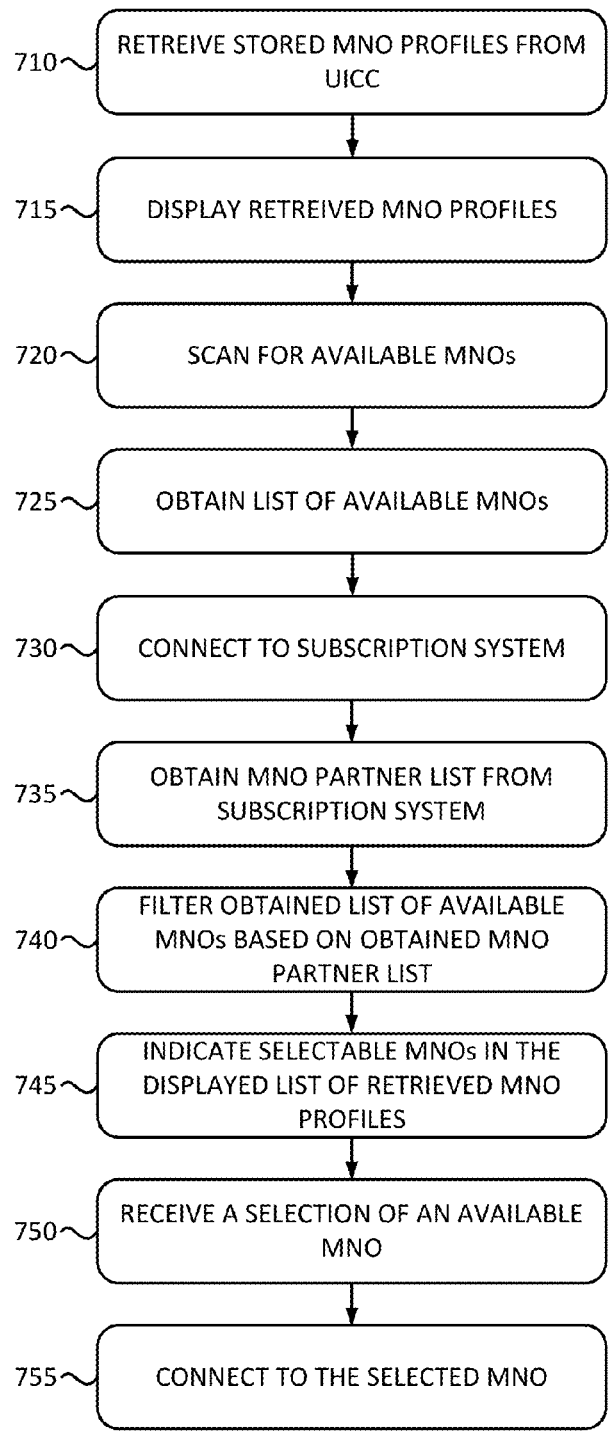
FIG. 7 is a flowchart of a process for selecting a mobile network operator according to an implementation described herein.

FIG. 7 is a flowchart of a process for selecting a mobile network operator according to an implementation described herein. In some implementations, the process of FIG. 7 may be performed by UE 110. In other implementations, some or all of the process of FIG. 7 may be performed by another device or a group of devices separate from UE 110.

The process of FIG. 7 may be performed in response to one or more trigger events. As an example, a user may activate MNO selection application 501 when the user selects to activate UICC 120 or when the user selects to switch to a different MNO. As another example, MNO selection application 501 may perform the process of FIG. 7 automatically in response to detecting that a new UICC 120 has been connected to UE 110, in response to detecting that a communication capability of UE 110 has been activated (e.g., the user has taken UE 110 out of airplane mode, etc.), in response to detecting that UE 110 is located in a new geographic area (e.g., a Global Position System (GPS) receiver of UE 110 detects that UE 110 is in a new country, etc.), and/or in response to another type of trigger event.

The process of FIG. 7 may include retrieving stored MNO profiles from a UICC (block 710) and displaying the retrieved the MNO profiles (block 715). For example, MNO selection manager 520 may request MNO profiles stored in MNO DB 435 via profile selection API 440 and may provide received MNO profile information to user interface 540 for display on touchscreen 220. Available MNOs may be scanned for (block 720) and a list of available MNOs may be obtained (block 725). For example, communication interface 340 of UE 110 may, via antenna assembly 350 exchange signals with base stations that are within transmission range of UE 110 and/or base stations within the transmission range of which UE 110 is located. As an example, UE 110 may monitor for signals transmitted by base station 135 by which base station 135 advertises its presence. As another example, UE 110 may send a signal that request a response from any base station within transmission range of the sent signal. A signal received from base station 135 may include an MNO identifier (e.g., MCC and MNC of an MNO) and MNO selection manager 520 may generate a list of available MNOs based on the MNO identifiers received via signals from base stations 135.

A subscription system may be connected to (block 730) and an MNO partner list may be obtained from the subscription system (block 735). UE 110 may connect to subscription system 150 using a process described below with reference to FIG. 8. UE 110 may request an MNO partner list for UICC 120 from subscription system 150, subscription system 150 may provide the requested MNO partner list in a response message, and MNO selection manager 520 may retrieve the list of MNO partners from the response message received from subscription system 150. In some implementations, subscription system 150 may additionally provide, in the response message or in connection with the response message, update files from one or more MNO profiles stored in UICC 120. The update files may include, for example, updated authentication keys, an updated activation application, an updated updates application, an updated billing application, an updated roaming list, and/or other types of updates.

The obtained list of available MNOs may be filtered based on the obtained MNO partner list (block 740) and selectable MNOs may be indicated in the displayed list of MNO profiles based on the filtered list of available MNOs (block 745). For example, only MNOs on the partner list may be selected by the user, since the provider of UICC 120 may need to have an existing relationship with an MNO, such as a partner agreement, before UE 110 activates a subscription for UICC 120 for the MNO. Thus, out of the detected available MNOs, based on the received base station signals, only MNOs on the partner list of MNOs may be indicated as selectable on the display provided to the user.

A selection of an available MNO may be made (block 750) and a connection may be established to the selected MNO (block 755). In some implementations, a user may select an MNO from the selectable MNOs via user interface 540. In other implementations, such as in M2M implementations, an MNO may be selected automatically by MNO selection manager 520. As an example, MNO selection manager 520 may automatically select an MNO based on a ranked list of preferred MNOs included in MNO selection application 501. As another example, MNO selection manager 520 may automatically select an MNO based on the signal strength of signals received from base stations associated with particular MNOs. For example, MNO selection manager 520 may select the selectable MNO associated with the strongest base station signal. As yet another example, MNO selection manager 520 may automatically select an MNO based on a particular application installed or activated on UE 110. For example, UE 110 may be configured for various applications and different applications may be partnered with, or otherwise associated with, particular MNOs. For example, in a first implementation, UE 110 may be included in a vending machine administered by a first entity partnered with a first MNO and in a second implementation, UE 110 may be included in a security camera administered by a second entity partnered with a second MNO.

Upon selection of an MNO, MNO selection manager 520 may activate the MNO profile for the selected MNO along with a corresponding MNO security domain 420 in UICC 420 in order to activate a subscription for the selected MNO. UE 110 may then connect to the selected MNO using the activated subscription. For example, UE 110 may attach to base station 135 of access network 130 associated with the selected MNO. Furthermore, in some implementations, UICC 120 may be activated by communicating with subscription system 150 (and/or another OTA system) to perform authentication and/or other processes required to complete the activation of the subscription on UICC 120.

Figure 8:
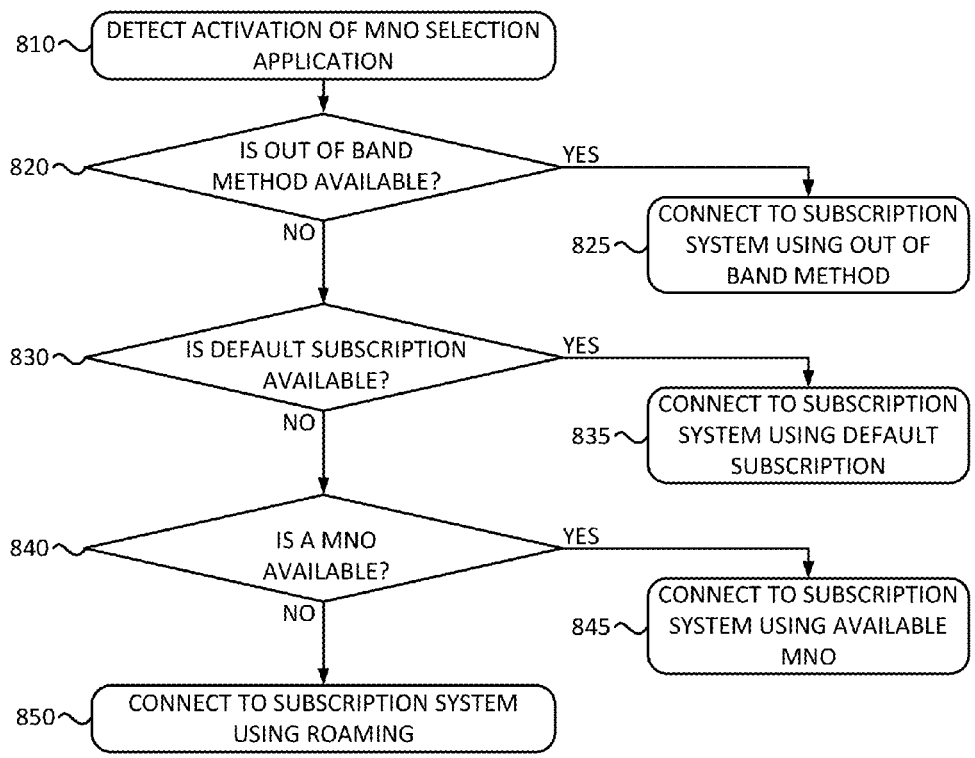
FIG. 8 is a flowchart of a process for connecting to a subscription system according to an implementation described herein.

FIG. 8 is a flowchart of a process for connecting to a subscription system according to an implementation described herein. In some implementations, the process of FIG. 8 may be performed by UE 110. In other implementations, some or all of the process of FIG. 8 may be performed by another device or a group of devices separate from UE 110.

The process of FIG. 8 may include detecting activation of an MNO selection application (block 810) and determining whether an out-of-band method is available (block 820). For example, once MNO selection application 501 is activated, MNO selection application 501 may attempt to establish a connection with subscription system 150. MNO selection application 501 may first attempt to use an out-of-band method that does not utilize a wireless connection with a base station, such as a wired connection or a short-range wireless connection, such as a WiFi connection or a Bluetooth connection. If an out-of-band connection is available (block 820—YES), a connection may be made to the subscription system using the out-of-band method (block 825). For example, MNO selection application 501 may send a request to subscription system 150 for a list of partner MNOs using the out-of-band method, such as a WiFi connection.

If an out-of-band method is not available (block 820—NO), a determination may be made as to whether a default subscription is available (block 830). For example, MNO selection application 501 may determine whether a default subscription has been designated and whether the MNO associated with the default subscription is available. If the default subscription is available (block 830—YES), a connection may be made to the subscription system using the default subscription (block 835). For example, MNO selection application 501 may attach to base station 135 of access network 130 of the MNO associated with the default subscription and may send a request to subscription system 150 for a list of partner MNOs via base station 135.

If a default subscription is not available (block 830—NO), a determination may be made if any MNOs are available (block 840). For example, if no default subscription has been designated or the MNO associated with the default subscription is not available, MNO selection application 501 may select one of the available MNOs for connecting to subscription system 150. For example, an MNO associated with base station 135 with the strongest signal may be selected. Thus, if an MNO is available (block 840—YES), a connection may be made to the subscription system using an available MNO (block 845). For example, MNO selection application 501 may attach to base station 135 of access network 130 of an available MNO and may send a request to subscription system 150 for a list of partner MNOs via base station 135 to determine which partner MNOs are available.

If an MNO is not available (block 840—NO), a connection may be made to the subscription system using roaming (block 850). For example, MNO selection application 501 may request a roaming connection to a base station associated with an MNO that is unknown to UICC 120 (e.g. for which a subscription is not available) and may send a request to subscription system 150 for a list of partner MNOs via the roaming connection to the base station.

Figure 9:
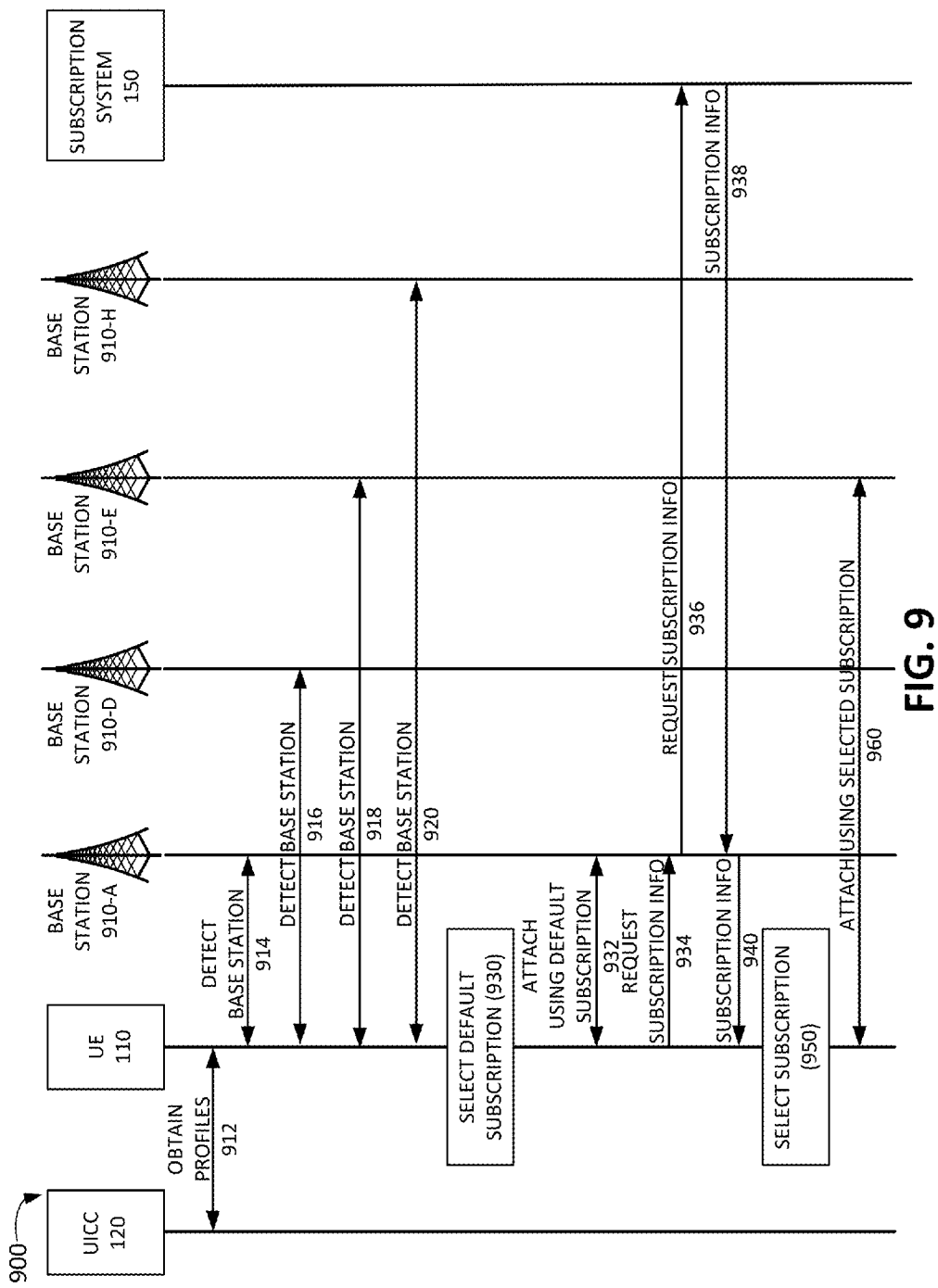
FIG. 9 is an exemplary signal flow diagram according to an implementation described herein.

FIG. 9 is an exemplary signal flow 900 according to an implementation described herein. Signal flow 900 may begin with MNO application 501 being activated and obtaining stored MNO profiles from UICC 120 (signal 912). Furthermore, UE 110 may detect a base station 910-A associated with a first MNO (signal 914), may detect a base station 910-D associated with a second MNO (signal 916), may detect a base station 910-E associated with a third MNO (signal 918) and may detect a base station 910-H associated with a fourth MNO (signal 920).

Further, assume that the first MNO, associated with base station 910-A, is associated with a designated default subscription and that no out-of-band methods are available. Thus, MNO application 501 may select a default subscription from UICC 120 (block 930) and may attach to base station 910-A using the selected default subscription (signal 932). Subsequently, UE 110 may request subscription information from subscription system 150 via base station 910-A (signals 934 and 936). Subscription system 150 may respond to the request by returning a list of partner MNOs for UICC 120 to UE 110 via base station 910-A (signals 938 and 940).

Figure 10:
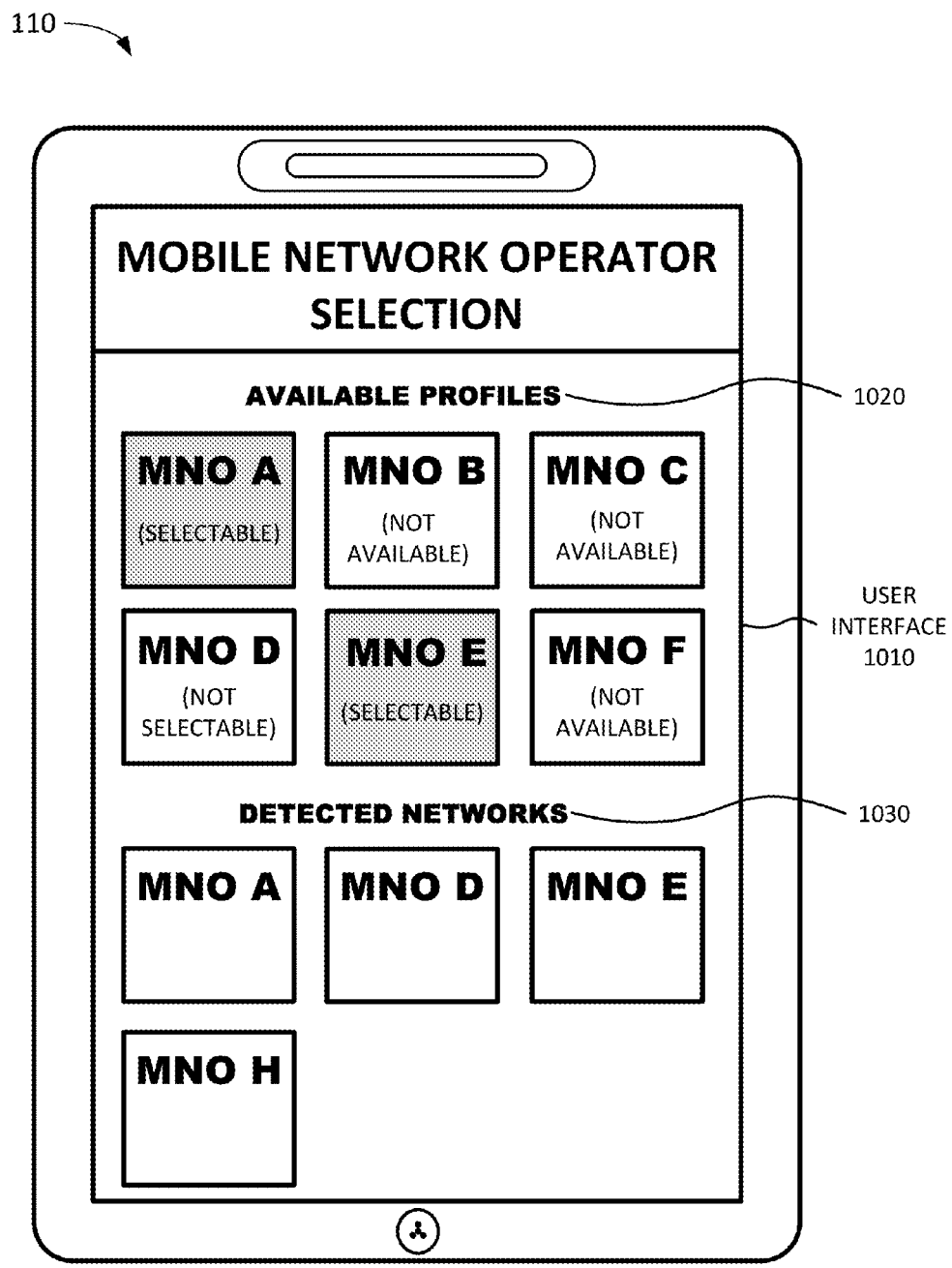
FIG. 10 is a diagram of an exemplary user interface according to an implementation described herein.

In response, MNO selection application 501 may generate a user interface that includes a list of selectable MNOs. FIG. 10 is a diagram of an exemplary user interface 1010 that may be generated by MNO selection application 501 in connection with signal flow 900 of FIG. 9. User interface 1010 may include a list of available MNO profiles 1020 that is stored on UICC 120. In this case, six different subscriptions are potentially available via UICC 120: MNO A, MNO B, MNO C, MNO D, MNO E, and MNO F.

Furthermore, user interface 1010 may include a list of available MNOs 1030 based on the detected base stations. In this case, as shown in FIG. 9, four MNOs were detected as being available: MNO A associated with base station 910-A, MNO D associated with base station 910-D, MNO E associated with base station 910-E, MNO H associated with base station 910-H. Since MNO H is not associated with a stored MNO profile, a subscription with MNO H is not available. Thus, only MNO A, MNO D, and MNO E are associated with available subscription. However, the list of partner MNOs received from subscription system 150 may indicate that only MNO A and MNO E are designated partner MNOs associated with UICC 120. Thus, only MNO A and MNO E are indicated as being selectable in user interface 1010. The user may select either MNO A or MNO E.

Returning to FIG. 9, assume the user selects MNO E (block 950). In response, MNO selection application 501 may activate a security domain associated with MNO E in UICC 120. Once the security domain is activated, UE 110 may activate the subscription associated with MNO E and UE 110 may attach to base station 910-E using the selected subscription (signal 960). Thus, in signal flow 900, the user may be able to select a particular MNO for UICC 120 that include multiple subscriptions.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As an example, while series of blocks have been described with respect to FIGS. 7 and 8, and series of signal flows have been described with respect to FIG. 9, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a mobile communication device, the method comprising:
   retrieving, by the mobile communication device, stored mobile network operator (MNO) profiles from a universal integrated circuit card (UICC);
   obtaining, by the mobile communication device, a list of available MNOs by communicating with base stations located within a transmission range of the mobile communication device;
   obtaining, by the mobile communication device, a list of partner MNOs from a subscription system;
   filtering, by the mobile communication device, the obtained list of available MNOs based on the obtained list of partner MNOs; and
   displaying, by the mobile communication device, selectable MNOs based on the retrieved MNO profiles and based on the filtered list of available MNOs.

2. The method of claim 1, further comprising:
   receiving a selection of one of the selectable MNOs from a user;
   activating an MNO security domain associated with the selected MNO in the UICC; and
   connecting to the selected one of the selectable MNOs, in response to receiving the selection of one of the selectable MNOs from the user.

3. The method of claim 1, further comprising:
   automatically selecting one of the selectable MNOs based on one or more criteria, wherein the one or more criteria include at least one of:
      a ranked list of preferred MNOs;
      signal strength associated with particular one of the available MNOs; or
      a particular application associated with the mobile communication device;
   activating an MNO security domain associated with the selected MNO in the UICC; and
   connecting to the selected one of the selectable MNOs, in response to automatically selecting of one of the selectable MNOs.

4. The method of claim 1, wherein obtaining the list of partner MNOs from the subscription system includes:
   determining whether an out-of-band communication method is available; and
   connecting to the subscription system using the out-of-band communication method, in response to determining that the out-of-band communication method is available.

5. The method of claim 1, wherein obtaining the list of partner MNOs from the subscription system includes:
   selecting a default MNO from the list of available MNOs; and
   connecting to the subscription system using the default MNO, in response to selecting the default MNO.

6. The method of claim 1, wherein obtaining the list of partner MNOs from the subscription system includes:
   determining that a default MNO is not available based on the list of available MNOs;
   selecting a first MNO from the list of available MNOs; and
   connecting to the subscription system using the first MNO, in response to selecting the first MNO.

7. The method of claim 1, wherein a particular MNO profile of the stored MNO profiles includes at least one of:
   a mobile country code (MCC) and a mobile network code (MNC) associated with the particular MNO profile;
   a telephone number assigned to the UICC by the MNO of the particular MNO profile;

an authentication key associated with the particular MNO profile;
an activation application associated with the particular MNO profile;
a billing application associated with the particular MNO profile; or
an updates application associated with the particular MNO profile.

8. The method of claim 1, wherein obtaining the list of partner MNOs from the subscription system includes:
obtaining an updates file for a particular MNO in the list of partner MNOs; and
updating the MNO profile for the particular MNO in the stored MNO profiles in the UICC.

9. The method of claim 1, wherein the method of claim 1 is performed in response to:
detecting that the UICC has been connected to the mobile communication device;
detecting that a communication capability of the mobile communication device has been activated; or
detecting that the mobile communication device is located in a new geographic area.

10. A mobile communication device comprising:
a universal integrated circuit card (UICC) to store a plurality of mobile network operator (MNO) profiles; and
logic configured to:
retrieve the stored plurality of MNO profiles from the UICC;
obtain a list of available MNOs by communicating with base stations located within a transmission range of the mobile communication device;
obtain a list of partner MNOs from a subscription system;
filter the obtained list of available MNOs based on the obtained list of partner MNOs; and
display selectable MNOs based on the retrieved MNO profiles and based on the filtered list of available MNOs.

11. The mobile communication device of claim 10, wherein the logic is further configured to:
receive a selection of one of the selectable MNOs from a user;
activate an MNO security domain associated with the selected MNO in the UICC; and
connect to the selected one of the selectable MNOs, in response to receiving the selection of one of the selectable MNOs from the user.

12. The mobile communication device of claim 10, wherein the logic is further configured to:
automatically select one of the selectable MNOs based on one or more criteria, wherein the one or more criteria include at least one of:
a ranked list of preferred MNOs;
signal strength associated with particular one of the available MNOs; or
a particular application associated with the mobile communication device;
activate an MNO security domain associated with the selected MNO in the UICC; and
connect to the selected one of the selectable MNOs, in response to automatically selecting of one of the selectable MNOs.

13. The mobile communication device of claim 10, wherein, when obtaining the list of partner MNOs from the subscription system, the logic is further configured to:
determine whether an out-of-band communication method is available; and connect to the subscription system using the out-of-band communication method, in response to determining that the out-of-band communication method is available.

14. The mobile communication device of claim 10, wherein, when obtaining the list of partner MNOs from the subscription system, the logic is further configured to:
select a default MNO from the list of available MNOs; and
connect to the subscription system using the default MNO, in response to selecting the default MNO.

15. The mobile communication device of claim 10, wherein, when obtaining the list of partner MNOs from the subscription system, the logic is further configured to:
determine that a default MNO is not available based on the list of available MNOs;
select a first MNO from the list of available MNOs; and
connect to the subscription system using the first MNO, in response to selecting the first MNO.

16. The mobile communication device of claim 10, wherein a particular MNO profile of the stored plurality of MNO profiles includes at least one of:
a mobile country code (MCC) and a mobile network code (MNC) associated with the particular MNO profile;
a telephone number assigned to the UICC by the MNO of the particular MNO profile;
an authentication key associated with the particular MNO profile;
an activation application associated with the particular MNO profile;
a billing application associated with the particular MNO profile; or
an updates application associated with the particular MNO profile.

17. The mobile communication device of claim 10, wherein, when obtaining the list of partner MNOs from the subscription system, the logic is further configured to:
obtain an updates file for a particular MNO in the list of partner MNOs; and
update the MNO profile for the particular MNO in the stored MNO profiles in the UICC.

18. A non-transitory computer-readable memory device storing instructions executable by a processor, the non-transitory computer-readable memory device comprising:
one or more instructions to retrieve stored mobile network operator (MNO) profiles from a universal integrated circuit card (UICC) coupled to a wireless communication device;
one or more instructions to obtain a list of available MNOs by communicating with base stations located within a transmission range of the wireless communication device;
one or more instructions to obtain a list of partner MNOs from a subscription system;
one or more instructions to filter the obtained list of available MNOs based on the obtained list of partner MNOs; and
one or more instructions to display selectable MNOs based on the retrieved MNO profiles and based on the filtered list of available MNOs.

19. The non-transitory computer-readable memory device of claim 18, further comprising:
one or more instructions to receive a selection of one of the selectable MNOs from a user;
one or more instructions to activate an MNO security domain associated with the selected MNO in the UICC; and one or more instructions to connect to the selected one of the selectable MNOs, in response to receiving the selection of one of the selectable MNOs from the user.

20. The non-transitory computer-readable memory device of claim 18, wherein the one or more instructions to obtain the list of partner MNOs from the subscription system include:
one or more instructions to determine whether an out-of-band communication method is available;
one or more instructions to connect to the subscription system using the out-of-band communication method, in response to determining that the out-of-band communication method is available;
one or more instructions to select a default MNO from the list of available MNOs, in response to determining that the out-of-band communication method is not available; and
one or more instructions to connect to the subscription system using the default MNO, in response to selecting the default MNO.

* * * * *